US010433569B2

(12) United States Patent
Rupp

(10) Patent No.: US 10,433,569 B2
(45) Date of Patent: *Oct. 8, 2019

(54) SYSTEM AND METHOD FOR MOVING A DISPENSER FROM A CLOSED MODE INTO A DISPENSING MODE FOR USE WITH A MOBILE CONFECTIONARY EDIFICE OR VEHICLE

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,509

(22) Filed: Jun. 5, 2017

(65) Prior Publication Data

US 2018/0020694 A1    Jan. 25, 2018

Related U.S. Application Data

(63) Continuation of application No. 14/475,512, filed on Sep. 2, 2014, now Pat. No. 9,668,498.

(60) Provisional application No. 61/872,518, filed on Aug. 30, 2013.

(51) Int. Cl.
*A23G 9/24*  (2006.01)
*A23G 9/28*  (2006.01)

(52) U.S. Cl.
CPC .............. *A23G 9/245* (2013.01); *A23G 9/28* (2013.01)

(58) Field of Classification Search
CPC .......... A23G 9/245; A23G 9/28; A23G 9/045; B60P 3/0257
USPC ........................................................ 222/108
See application file for complete search history.

(56) References Cited

U.S. PATENT DOCUMENTS

| 9,668,498 | B2* | 6/2017 | Rupp .................... A23G 9/245 |
| 2004/0016772 | A1 | 1/2004 | Rupp |
| 2008/0179346 | A1 | 7/2008 | Downey |
| 2009/0078724 | A1 | 3/2009 | Lamb |
| 2014/0027471 | A1 | 1/2014 | Tollefson |
| 2014/0239020 | A1 | 8/2014 | Lamb |
| 2016/0044936 | A1 | 2/2016 | Tollefson |

* cited by examiner

*Primary Examiner* — Jeremy Carroll
(74) *Attorney, Agent, or Firm* — Terrence J. Edwards; TechLaw Ventures, PLLC

(57) ABSTRACT

The disclosure extends to methods, systems, and devices for producing a shaved ice or snow cone products and providing toppings thereto. The system may comprise an ice shaving or snow cone machine, a mobile edifice, and a topping dispenser attached to the mobile edifice.

31 Claims, 16 Drawing Sheets

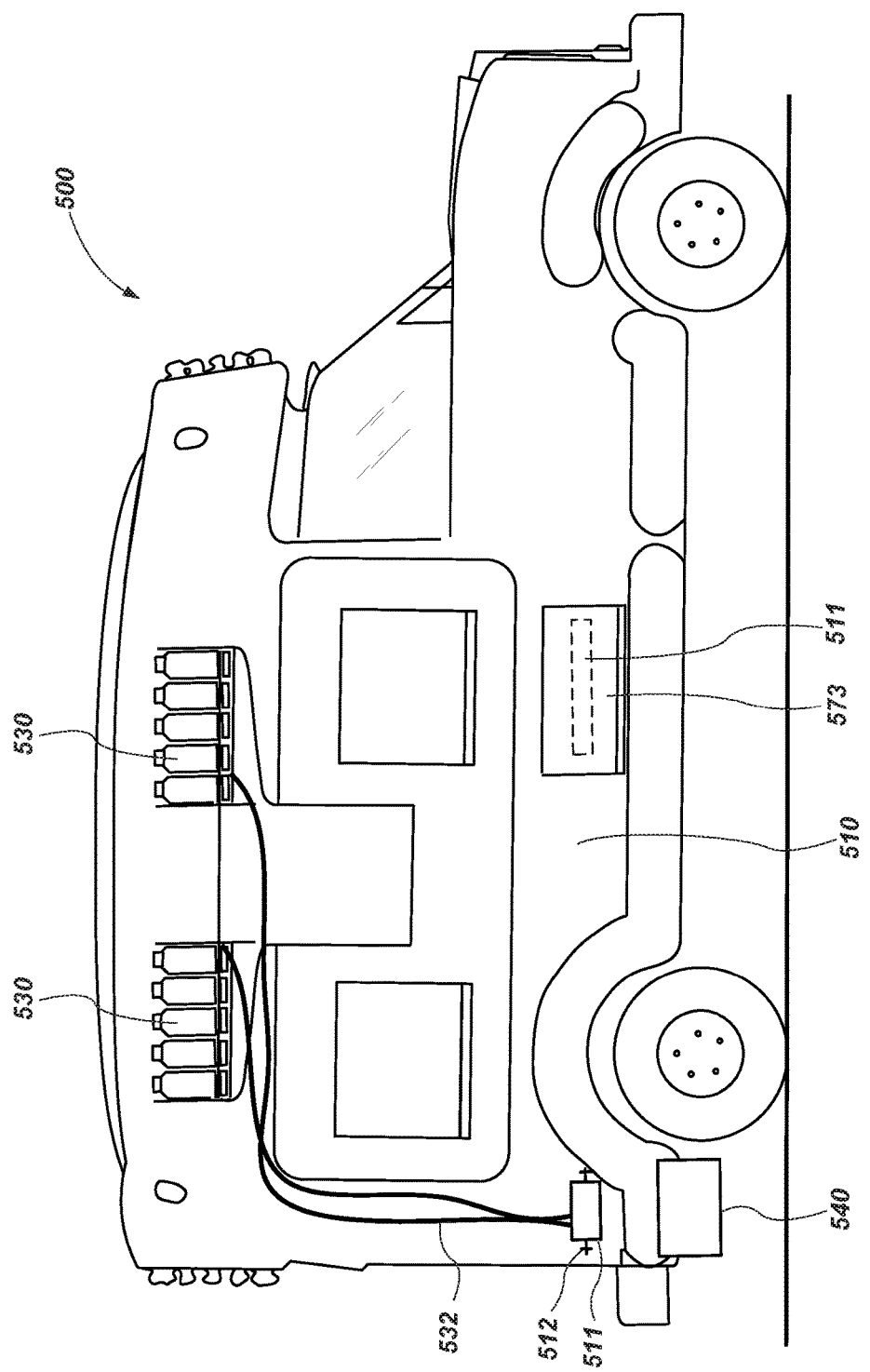

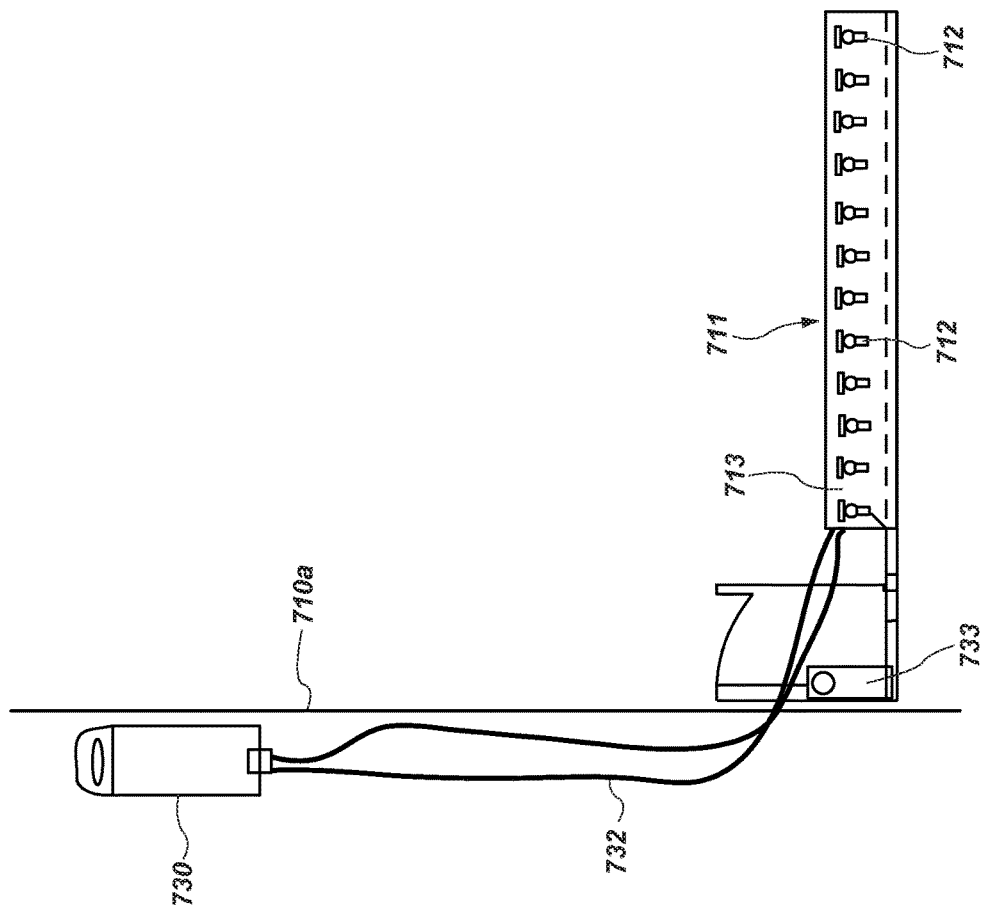

SYSTEM AND METHOD FOR MOVING A DISPENSER FROM A CLOSED MODE INTO A DISPENSING MODE FOR USE WITH A MOBILE CONFECTIONARY EDIFICE OR VEHICLE

CROSS-REFERENCE TO RELATED APPLICATIONS

This application is continuation of U.S. patent application Ser. No. 14/475,512, filed Sep. 2, 2014 (now U.S. Pat. No. 9,668,498, issued Jun. 6, 2017) and which claims the benefit of U.S. Provisional Application No. 61/872,518, filed Aug. 30, 2013, which are incorporated herein by reference in their entirety, including but not limited to those portions that specifically appear hereinafter, the incorporation by reference being made with the following exception: In the event that any portion of the above-referenced applications are inconsistent with this application, this application supersedes said above-referenced applications.

STATEMENT REGARDING FEDERALLY SPONSORED RESEARCH OR DEVELOPMENT

Not Applicable.

BACKGROUND

The disclosure relates generally to mobile edifices and vehicles for use in preparing, dispensing and topping shaved ice or snow cone confectioneries, and more particularly, but not necessarily entirely, to a mobile edifice for use in providing shaved ice or snow cones prepared by a machine for that purpose and a topping dispenser for topping and flavoring shaved ice or snow cone confectionaries.

A variety of machines have been developed, described and are widely known for creating or processing cold deserts and confectioneries by processing ice into more appealing eatable forms, such as snow cones and shaved ice. Such devices produce either ice granules (snow cones) or light, fluffy, finely textured shaved ice for subsequent flavoring using syrups. Dispensing the syrups as toppings to a usually unflavored ice product can be time consuming for workers. Additionally, most customers desire different levels or amounts of toppings or flavoring syrups. Thus, it is advantageous to make topping dispensers available for customer use such that a customer can flavor the base ice product themselves.

As disclosed herein below, the disclosure provides an apparatus, system and method for providing a topping dispenser or a plurality of topping dispensers on a mobile edifice or vehicle for customer use.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like, which has been included in the specification is not to be taken as an admission that any or all of these matters form part of the prior art base, or were common general knowledge in the field relevant to the disclosure as it existed before the priority date of each claim of this disclosure.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIG. 5 illustrates a side view of an implementation of a mobile edifice for providing a shaved ice or snow cone product for receiving toppings in accordance with the teachings and principles of the disclosure;

FIG. 7B illustrates an implementation of an open dispenser or dispenser in the dispensing mode in relation to an edifice in accordance with the teachings and principles of the disclosure;

DETAILED DESCRIPTION

The disclosure extends to methods, systems, and devices for producing a shaved ice or snow cone product. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Before the methods, systems and devices for producing a shaved ice or snow cone product are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the terms "shaved ice" and/or "snow cone" refer broadly to the large family of ice-based desserts or confections made from the fine shavings of ice or finely crushed ice. It will be appreciated that shaved ice and/or snow cones may often include a flavoring that may be a syrup or other sweetened condiment that is added to the shaved ice or snow cone. Similarly, the terms "ice shaving" or "snow cone" in reference to a machine are intended broadly to include all machines used to make or produce the large family of ice-based desserts or confections that may be classified as shaved ice or snow cone products.

As used herein, the term "edifice" is used to refer broadly to structures that generally form a boundary from which other structures can be attached to and from which to provide frozen confections.

Figure 1:
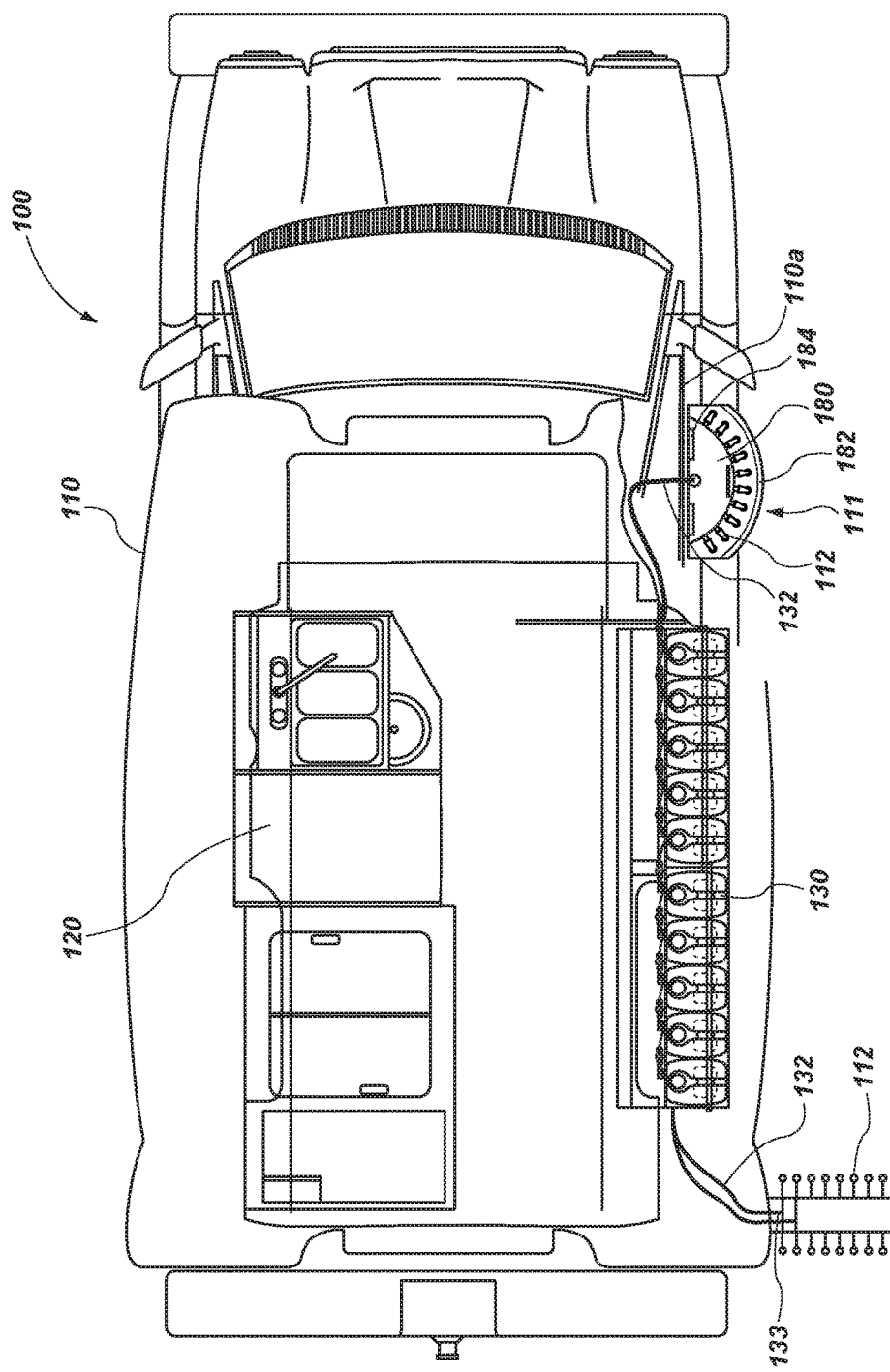
FIG. 1 illustrates an implementation of a mobile edifice and a topping dispenser for producing a shaved ice or snow cone product in accordance with the teachings and principles of the disclosure.
Figure 2:
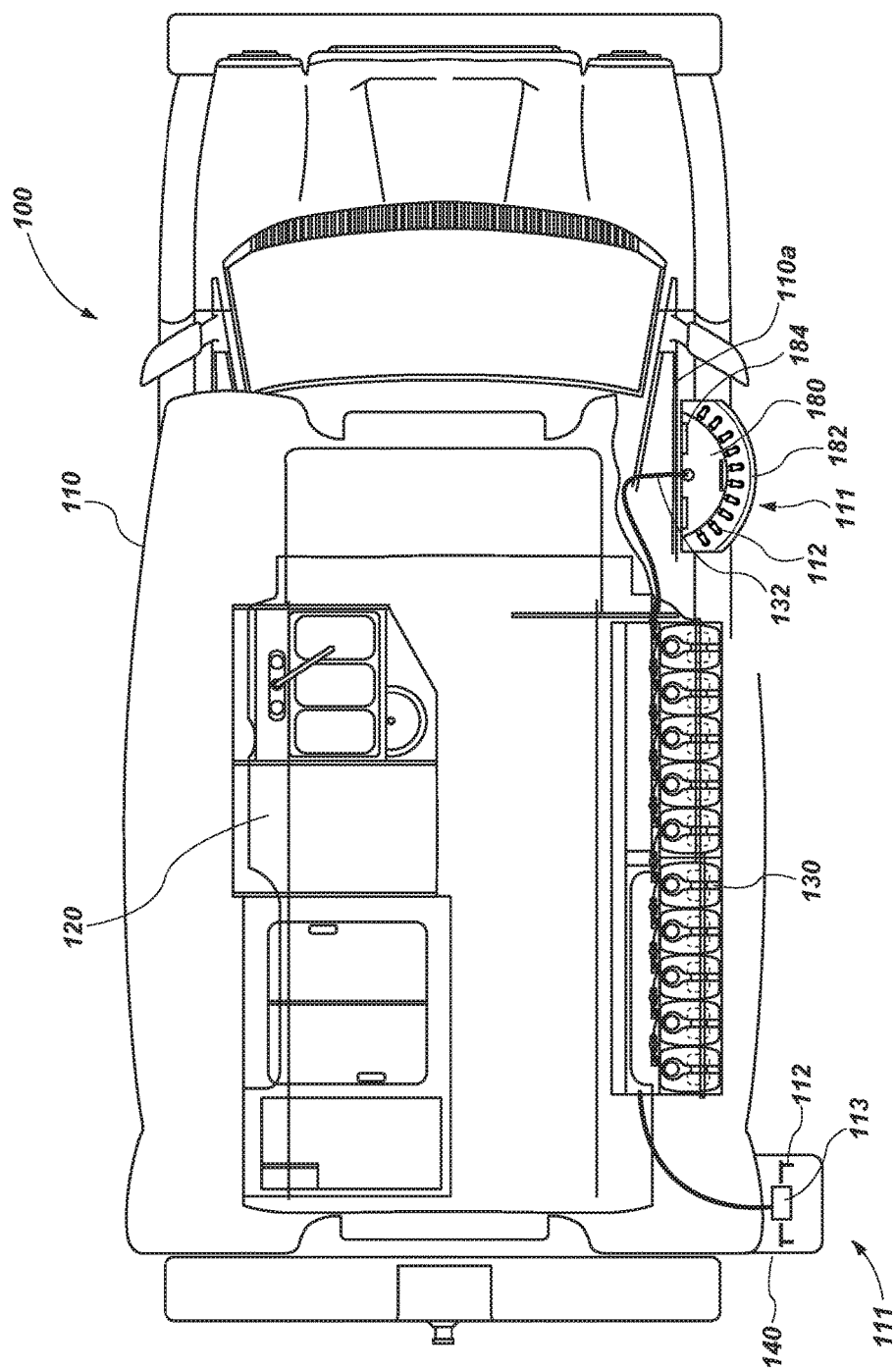
FIG. 2 illustrates an implementation of an edifice and topping dispenser for a shaved ice or snow cone product in accordance with the teachings and principles of the disclosure.
Figure 3:
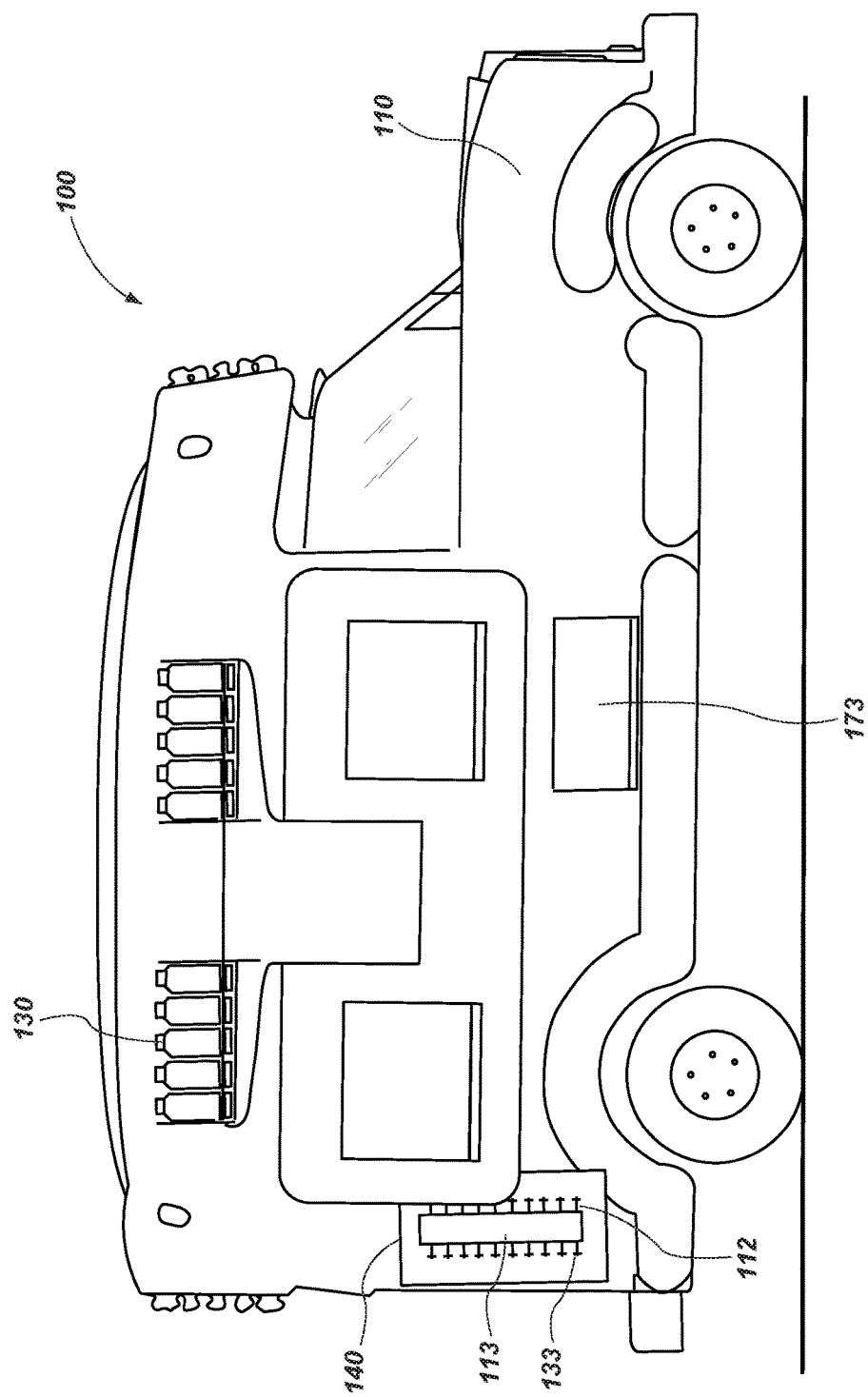
FIG. 3 illustrates a side view of an implementation of a mobile edifice and topping dispenser for producing and topping a shaved ice or snow cone product in accordance with the teachings and principles of the disclosure.

Referring now to FIGS. 1-3, there is illustrated an implementation of a system and method for rotating or moving a dispenser from a closed mode into a dispensing mode for use with a mobile confectionary edifice or vehicle. Illustrated in FIGS. 1-2 are top-down views of an implementation of a mobile frozen confection providing system 100 in accordance with the features and teachings of the disclosure. The mobile frozen confection system 100 may comprise a mobile edifice 110 from which to provide the frozen confections. In the industry it is common for vendors to sell confections at many locations at many different dates and times while trying to satisfy customer demand. Accordingly, a mobile edifice 110 is desirable, and one that could be deployed quickly would give vendors an advantage in meeting demand. The mobile edifice 110 may be a vehicle of any type or attached to a vehicle of any type. Thus, it is within the scope of this disclosure to include self-powered vehicles such as cars, trucks, vans, trains, carts, sleds, snowmobiles, boats, ATVs, motorcycles, and the like as mobile edifices. Edifices may also be self-powered vehicles that may be pushed, towed, dropped, and floated into place. Self-powered edifices may be such things as shacks, kiosks, booths, tables, coolers, umbrellas, and the like. An edifice 110 may provide surfaces 115 and structures to mount a liquid topping dispenser 111. For example, as can be seen in the figure, an edifice 110 may be configured to look like a bus or another type of structure or vehicle. It will be appreciated that the liquid topping dispenser 111 is shown in the figure as being mounted on the side surface of the vehicle, at a location that provides access to customers who are topping their own frozen confections with flavoring syrups or other toppings.

An implementation my further comprise a frozen confection machine 120 disposed on the mobile edifice 110 for providing conditioned or treated ice for confectionary use. A frozen confection machine 120 may condition or treat ice into a snow like edible form that may be topped with a topping. The frozen confection machine 120 may be of a type disclosed in U.S. patent application Ser. No. 13/414,170; and U.S. Pat. No. 6,908,053 (Rupp) and U.S. Pat. No. 6,527,212 (Rupp), all of which are hereby incorporated by this reference in their entireties.

An implementation of the disclosure may comprise a topping dispenser 111 for providing toppings to the conditioned or treated ice. Toppings may be liquid and/or may be solid pieces configured for dispensing. The toppings dispenser 111 may comprise a plurality of spouts 112 mounted on a frame work 113 such that a plurality of toppings can be dispensed or offered simultaneously to a single or a plurality of users. The plurality of spouts 112 may correspond to a plurality of topping reservoirs 130 wherein the topping reservoirs 130 are in fluid communication with the plurality of spouts 112. The reservoirs 130 may be disposed remotely from the spouts 112, such that the spouts 112 may be located relatively close together. In an implementation, the spout 112 and its corresponding reservoir 130 may be connected by tubing 132 to provide fluid communication between them. The tubing 132 may be flexible and may connect spouts 112 to reservoirs 130 through a wall or other structure making up the mobile edifice 110. For example, in an implementation it may be advantageous for the reservoirs 130 to be located within the bounds of the edifice 110 so that workers can refill the reservoirs 130 without leaving the edifice 110. The reservoirs 130 may also be located within the edifice 110 in order to protect the reservoirs 130 from damage and access by the public. Additionally, by locating the topping dispenser 111 and spouts 112 outside of the edifice 110, the users/customers may have access to the toppings without the involvement of the worker for increased efficiency. In other words, the customers are able to customize their own confection by using any number of spouts 112 and adding any number of flavorings or other toppings to their liking.

Continuing to refer to FIGS. 1-3, in an implementation, the topping dispenser 111 may be deployed and un-deployed so as to protect it during transport and times of non-use or non-business. The deployment of the topping dispenser 111 may use a linkage 133 allowing the dispenser 111 to be deployed from a closed position to an open position and from an open position to a closed position. The linkage 133 may comprise a pivot 133a by which the dispenser 111 rotates from the opened to closed positions and vice-versa, such that the spouts 112 move in an arced path. The pivot 133a may provide a single degree of freedom of movement wherein the length of the dispenser 111 may be positioned substantially vertical and may be substantially aligned with a substantially vertical surface of the edifice 110 while in the closed position. The pivot 133a may also provide a single degree of freedom of movement wherein the length of the dispenser 111 may be positioned substantially normal with respect to a substantially vertical surface of the edifice 110 while in the open position. Tubes 132 or other fluid communication channels may connect the spouts 112 to the reservoirs 130. In an implementation, some of the reservoirs 130 may be remotely located from the corresponding spouts 112 such that some of the reservoirs 130 are located within the edifice 110 while others of the reservoirs 130 are located outside of the edifice 110.

As is further illustrated in FIGS. 1-3, an implementation may further comprise a cover 140 that may be configured to cover a plurality of spouts 112 and the framework 113 that they are mounted to, while the mobile edifice 110 is not in commercial use or is in transit.

Referring specifically to FIGS. 1 and 2, an implementation may further comprise a structure or frame 180 for supporting a dispenser 111 having a plurality of spouts 112 and a receiving tray or dish 182, wherein the structure or frame 180 may be attached to the edifice 110. In an implementation, the structure or frame 180 may comprise an attachment mechanism 184 that may hang from or be hangable on a wall or a window of the edifice 110 using hanger brackets or other attachment mechanism 184. It will be appreciated that the spouts 112 may be in fluid communication with the fluid reservoirs 130. In an implementation, the fluid communication is provided using tubes or lines that 132 for carrying liquid or other fluids. The tubes or lines 132 providing the fluid communication mechanism may extend through a substantially vertical surface 110a of the edifice 110 to the reservoirs 130 for receiving the flavoring or other toppings used for confectionary products.

Referring specifically to FIG. 3, in an implementation the edifice 110 may comprise a structure comprising a plurality of spouts 112 for dispensing fluids and a cover mechanism that opens and closes to expose the plurality of spouts 112, which can be used either alone or in combination with the hangable structure or frame 180 illustrated in FIGS. 1 and 2. It will be appreciated that the edifice 110 may include at least one upstanding side wall or a substantially vertical surface 110a and an interior space surrounded by the at least one upstanding side wall or substantially vertical surface 110a. The edifice 110 may comprise an opening extending through the side wall or substantially vertical surface 110a through which the prepared confections or containers may be dispensed or sold. A dispenser 111 may be supported by the edifice 110 and may comprise a plurality of spouts 112 positioned such that a person located outside the edifice may dispense a flavor or topping onto a prepared confection, such as a snow cone or shaved ice product, or into a dispensing container that is disposed generally beneath at least one of the plurality of spouts. It will be appreciated that each of the plurality of spouts 112 may be in fluid communication with a reservoir 130 and may attached to said reservoir 130 by at least one tube or line 132. The dispenser 111 may comprise a tray or dish 182 positioned beneath and spaced away from the plurality of spouts 112 and configured for catching liquid dropped from at least one of the plurality of spouts 112. The tray or dish may operate to direct the dropped liquid to a waste container carried on the edifice or otherwise located remotely from the dispensing area. The dispenser 111 may be covered by a structural member 173, such as a cover member, in a closed mode (as illustrated in FIG. 3) and the structural member 173 may be moved to expose the plurality of spouts 112 when in the open position. It will be appreciated that the dispenser 111 may be configurable between the open or dispensing position and the closed position and from a closed position to an open position a by a person located within the interior space of the edifice 110.

Figure 4B:
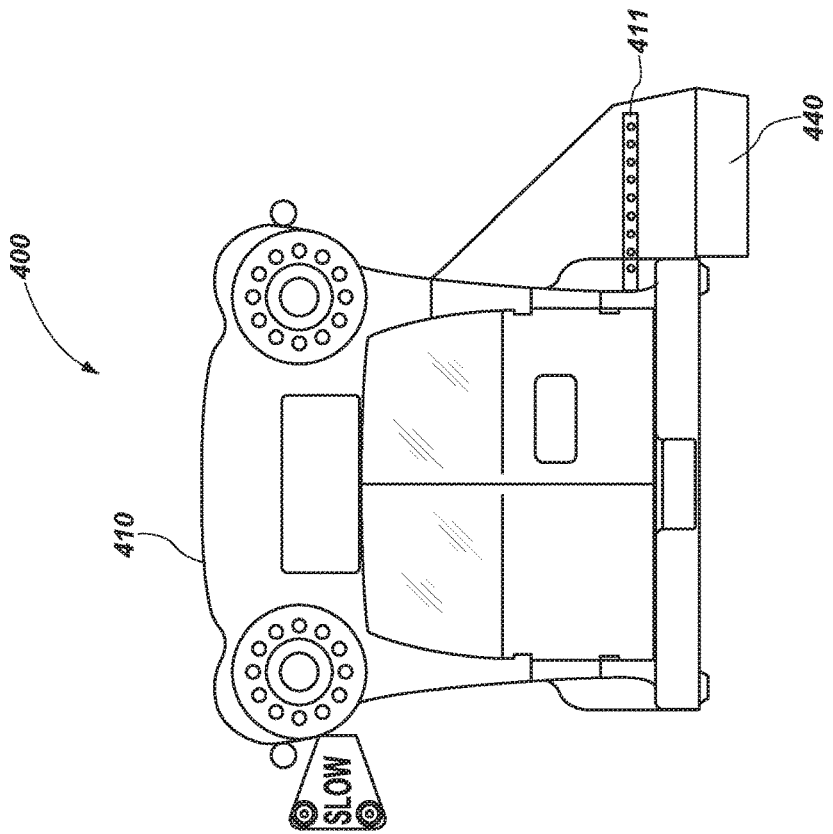
FIG. 4B illustrates a back view of a mobile edifice and a side view of an implementation of the deployment of a cover and a drip pan related to topping a shaved ice or snow cone product in accordance with the teachings and principles of the disclosure, wherein the cover and drip pan are shown in the open or dispensing position.
Figure 4A:
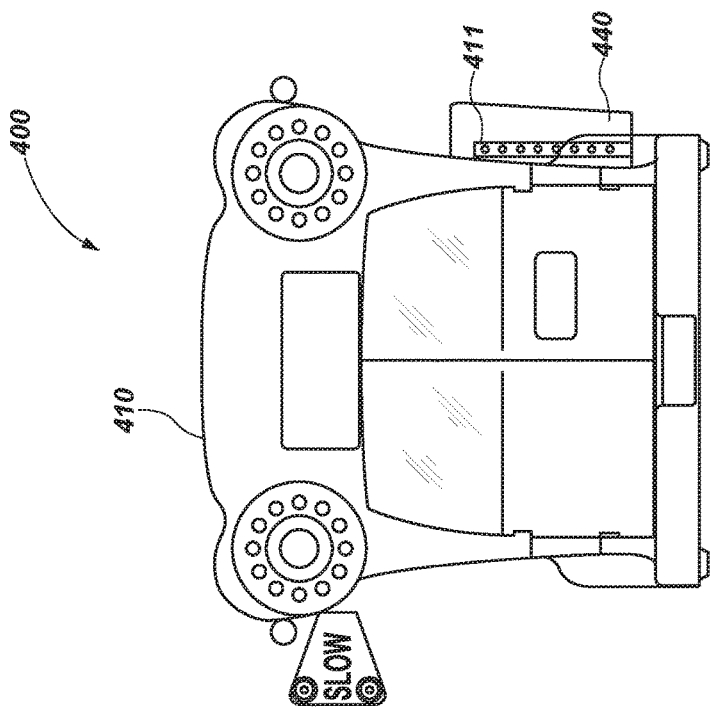
FIG. 4A illustrates a back view of a mobile edifice and a side view of an implementation of the deployment of a cover and a drip pan related to topping a shaved ice or snow cone product in accordance with the teachings and principles of the disclosure, wherein the cover and drip pan are shown in the closed position.

FIG. 4A and FIG. 4B illustrate the use and deployment of a cover as a drip pan. In an implementation, the cover 440 may substantially cover the dispenser 411 while in the closed position as illustrated in FIG. 4A, and then serve as a drip pan 440a when the dispenser 411 is deployed as illustrated in FIG. 4B. It should be noted that the cover/drip pan may attach to the edifice 410, the framework 413 or other parts of the dispenser 411.

In an implementation illustrated in FIG. 5, a mobile edifice 510 may comprise a cover 540 that may be used as a drip pan that may be placed under the spouts 512 so as to catch excess toppings from the dispenser 511. As illustrated, the drip pan 540 may attach to the edifice 510 or dispenser 511. It should be noted that the drip pan 540 may simply rest on the ground under the spouts 512 so as to catch excess toppings from the dispenser 511 as shown in dashed lines in the figure.

In an implementation, the cover 540 may be detachably connected to the edifice 510 while the dispenser 511 is in the closed position, and in an implementation the cover 540 may be detachably connected to the framework 513 while the dispenser 511 is in the closed position.

Figure 6A:
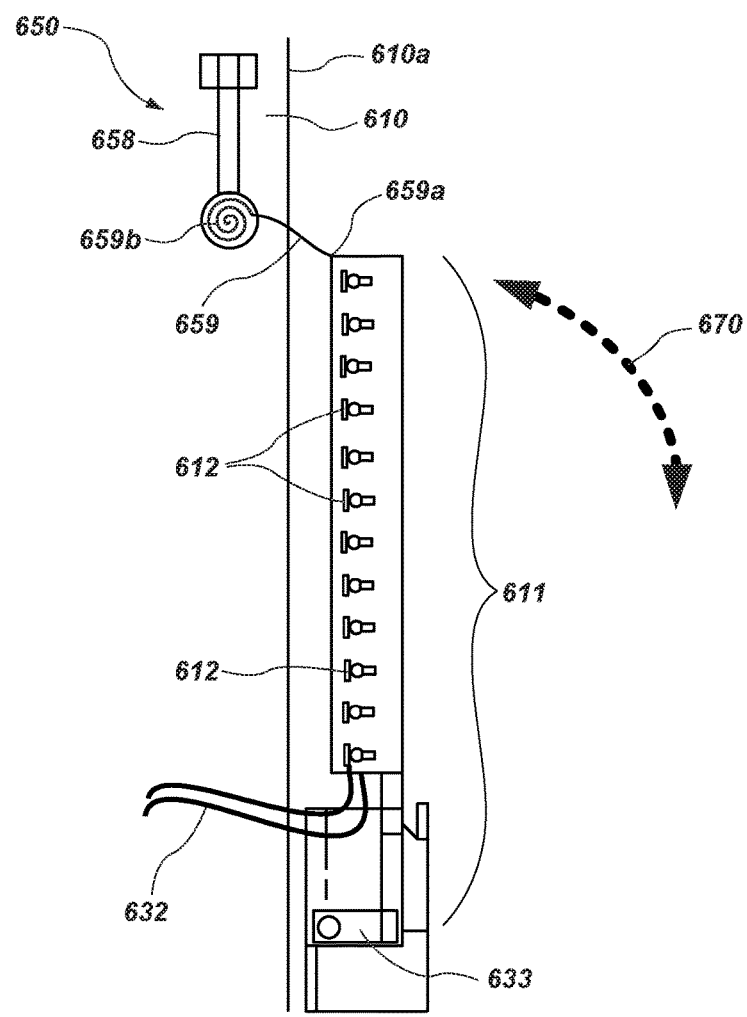
FIG. 6A illustrates an implementation of a closed dispenser in relation to an edifice in accordance with the teachings and principles of the disclosure.
Figure 6B:
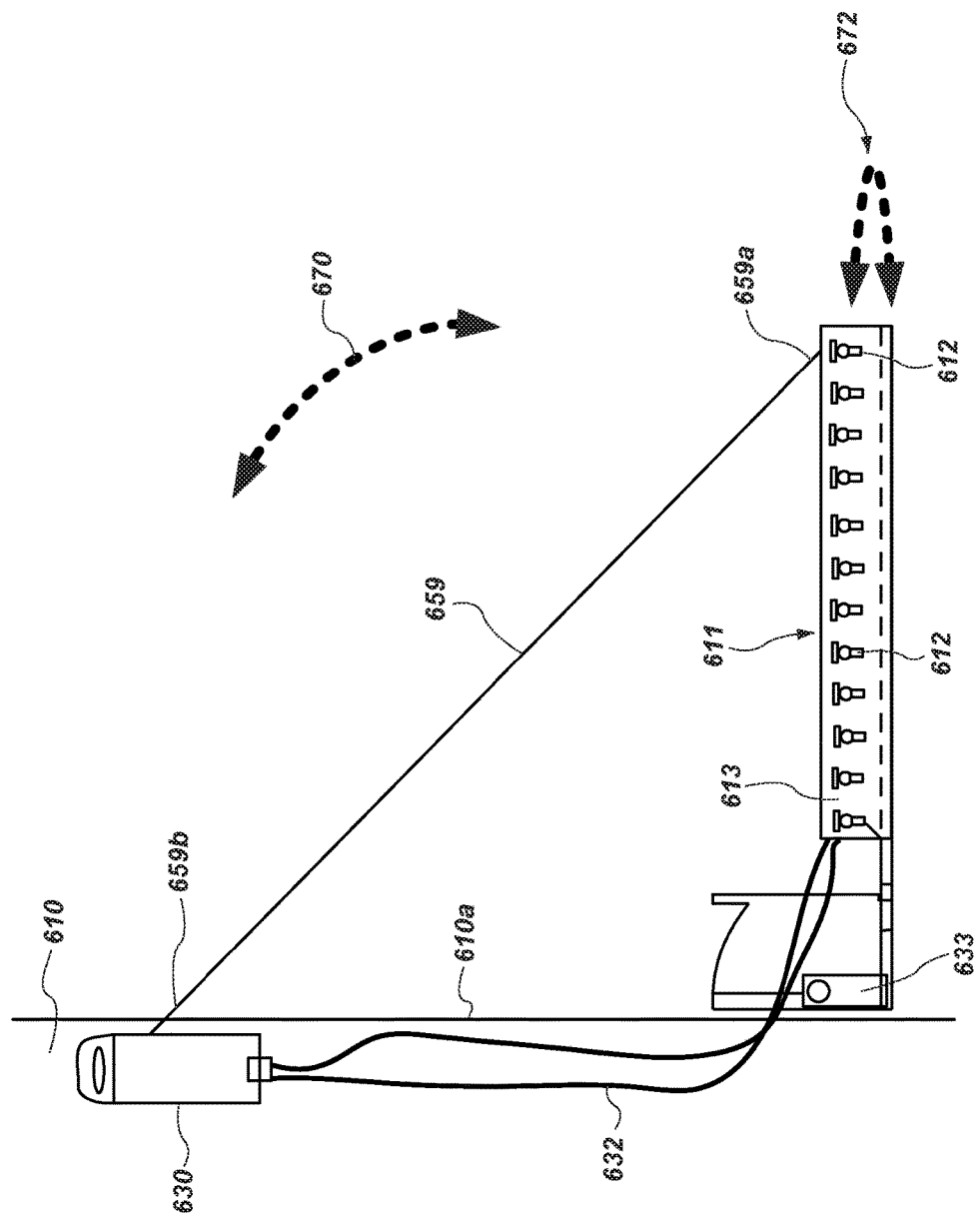
FIG. 6B illustrates an implementation of an open dispenser or dispenser in the dispensing mode in relation to an edifice in accordance with the teachings and principles of the disclosure.

As can be seen in FIG. 6A and FIG. 6B, the system may further comprise a deployment mechanism 650 for actuating a linkage 633 that is configured for opening and closing the dispenser 611 from within the edifice 610. As seen in the figure, the deployment mechanism 650 may comprise a lever 658 for deploying the dispenser 611 wherein the lever 658 provides leverage for a user to assist in actuating the linkage 633.

As illustrated, an implementation of a deployment mechanism 650 may comprise a cable 659 for deploying the dispenser 611. The cable 659 may be attached to the dispenser 611 at a first end 659a and the mobile edifice 610 at a second end 659b. In an implementation, the cable 659 may be attached to both the dispenser 611 and the drip pan 640, which may also be used as a cover for the dispenser 611 when the dispenser 611 is in the closed position. In an implementation, the cable 659 may be attached to the drip pan 640, and, in such an implementation, the drip pan 640 may be in mechanical communication with the dispenser 611, such that as the deployment mechanism 650 at least partially operates to move the dispenser 611 and drip pan 640 from a closed position to an open position and from an open position to a closed position. It will be appreciated that the cable 659 may operate as part of the deployment mechanism 650, but may also be utilized as a support cable to provide added tensile strength when the frame work 613 of the dispenser 611 is deployed in an open or dispensing position. The cable 659 may also be used to provide a force that lifts the dispenser 611 into the closed position.

As illustrated in FIGS. 6A and 6B, a linkage 633 may be a pivot having a single degree of freedom of movement and allowing an arced path for the spouts 612 of a dispenser 611 while the spouts 612 and dispenser 611 are being deployed and un-deployed. It should be noted that the linkage 633 may be configured to have two degrees of freedom of movement, such that the final open position can be adjusted during deployment. Additionally, the linkage 633 may be configured to have three degrees of freedom of movement, such that the final open position can be adjusted during deployment.

Figure 7A:
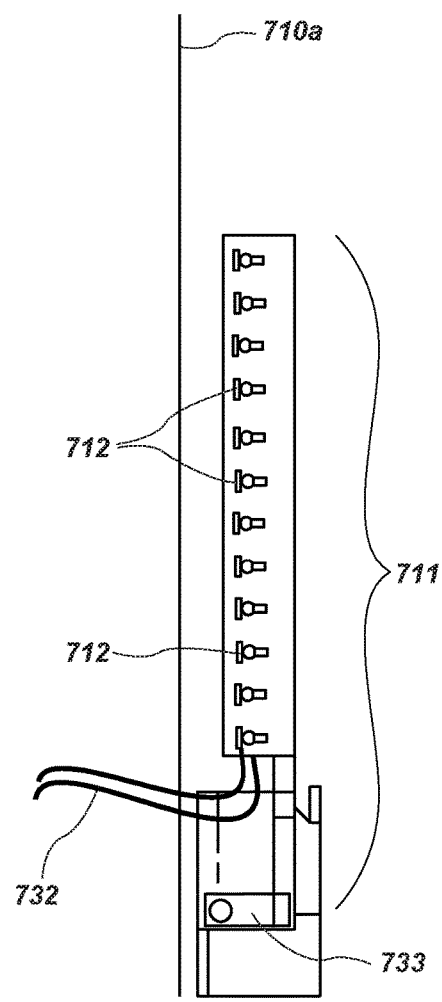
FIG. 7A illustrates an implementation of a closed dispenser in relation to an edifice in accordance with the teachings and principles of the disclosure.
Figure 7C:
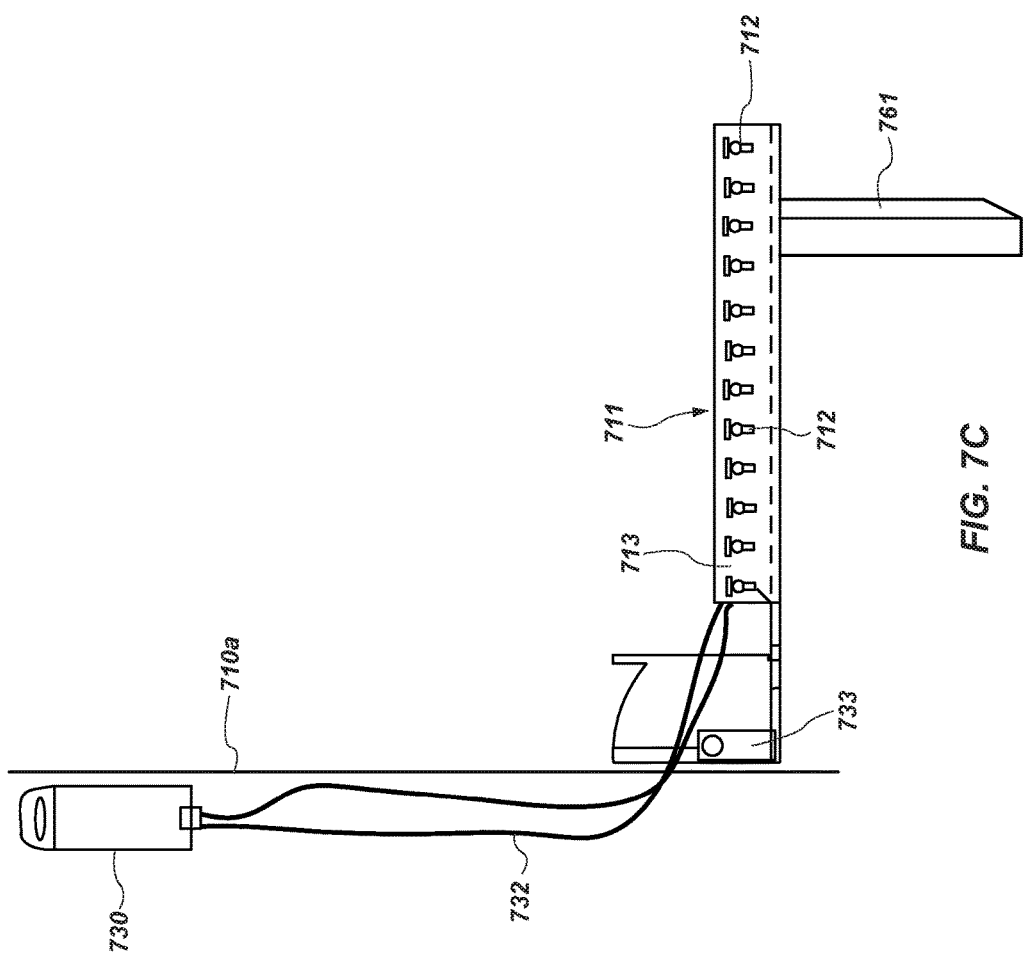
FIG. 7C illustrates an implementation of an open dispenser or dispenser in the dispensing mode in relation to an edifice in accordance with the teachings and principles of the disclosure.

Referring now to FIGS. 7A-7C, an implementation of the disclosure may comprise a linkage 733. The linkage 733 may be a pivot having a single degree of freedom of movement and allowing an arced path for the spouts 712 of a dispenser 711 while the spouts 712 and dispenser 711 are being deployed and un-deployed. It should be noted that the linkage 733 may be configured to have two degrees of freedom of movement, such that the final open position can be adjusted during deployment. Additionally, the linkage 733 may be configured to have three degrees of freedom of movement, such that the final open position can be adjusted during deployment. In an implementation, frame work 713 for the dispenser 711 may comprise a structural support member 761 for supporting the frame work 713. It will be appreciated that the structural support member 761 may be a leg or any other mechanical or structural support member that are well known in the field without departing from the scope of the disclosure.

Figure 8:
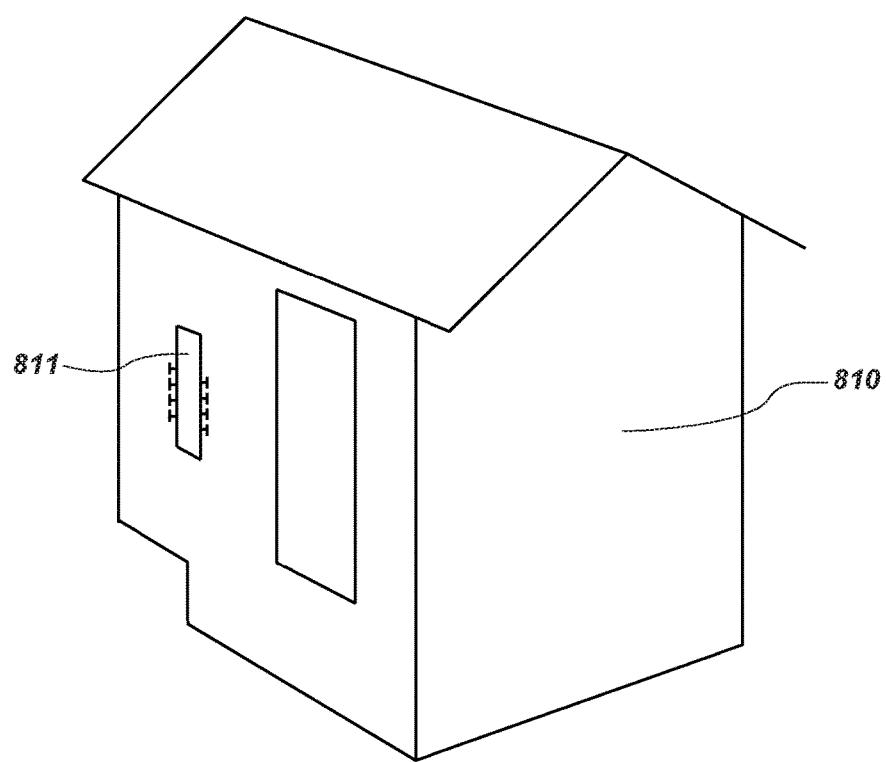
FIG. 8 illustrates an implementation of a mobile edifice and a topping dispenser for providing a shaved ice or snow cone product for receiving toppings in accordance with the teachings and principles of the disclosure, wherein the topping dispenser is in a closed position.

FIG. 8 illustrates a mobile edifice 810 that is a re-locatable shack or kiosk that can be relocated as desired to meet demand or as desired. For example, such a mobile shack or kiosk may be located a football field or a soccer field or any other event where concessions are desirable.

Figure 9:
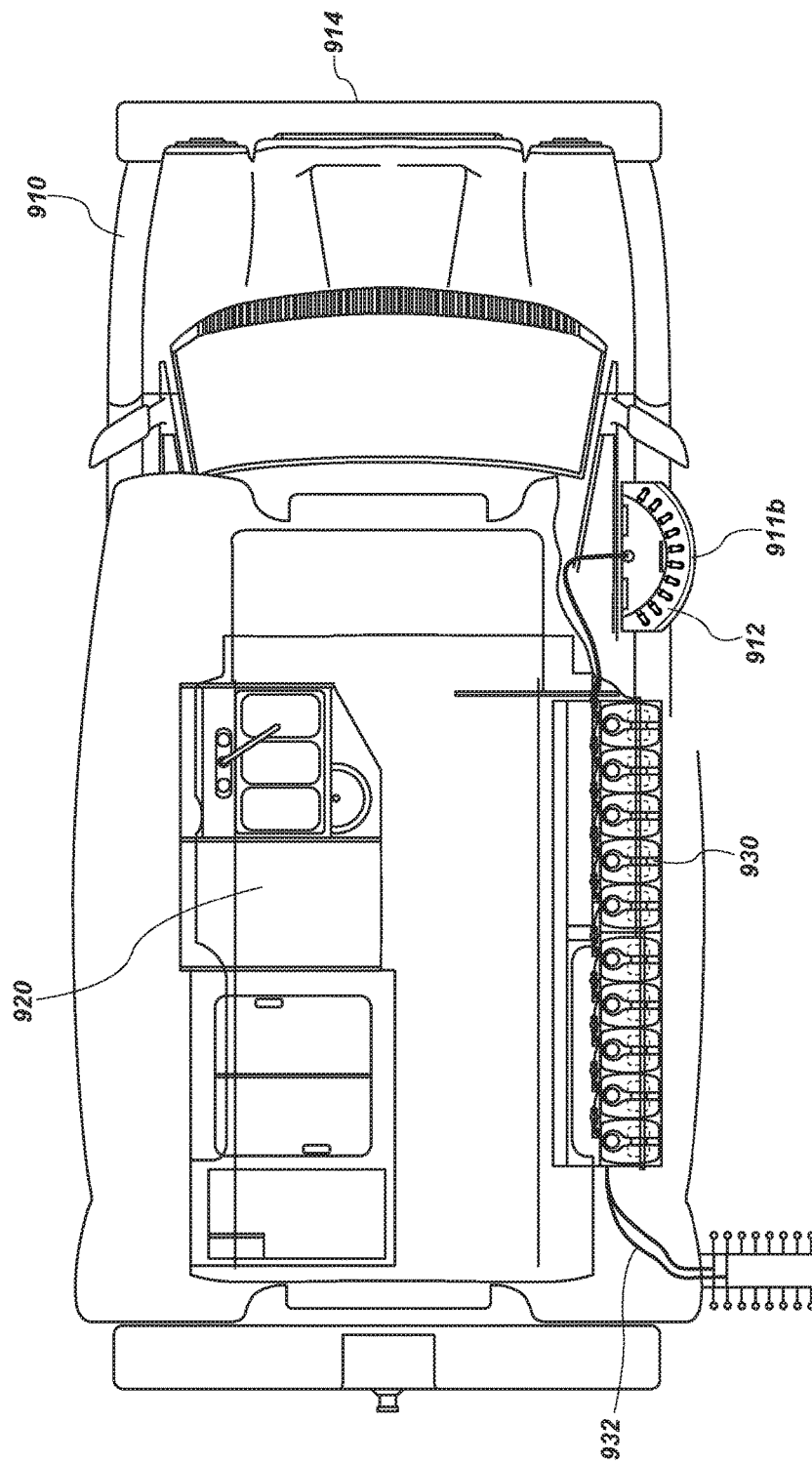
FIG. 9 illustrates a top down view of a mobile edifice having a plurality of dispensers.

FIG. 9 illustrates a mobile edifice 910 having a plurality of dispensers 911a, 911b disposed thereon. As can be seen in the figure, a plurality of dispensers 911a, 911b may be disposed around the perimeter 914 of the edifice 910 thereby allowing more customers access to toppings from the dispensers 911a, 911b. In an implementation, the plurality of dispensers 911a, 911b may each comprise a plurality of spouts 912 connected to common corresponding reservoirs 930. In an implementation each dispenser may correspond to individual sets of reservoirs. For example, an implementation of a mobile edifice may be located in an area where customers prefer mainly three of 50 available toppings. Accordingly, a first dispenser 911a may comprise a plurality of spouts 912 that represent or are associated with all of the 50 available toppings, and a second dispenser 911b may comprise only spouts 912 dedicated to the preferred toppings, for example, the one, two, three, four, or five most popular toppings. It will be appreciated that a number of other configurations may be implemented by the disclosure in accordance with the teachings and principles of the disclosure.

Figure 10:
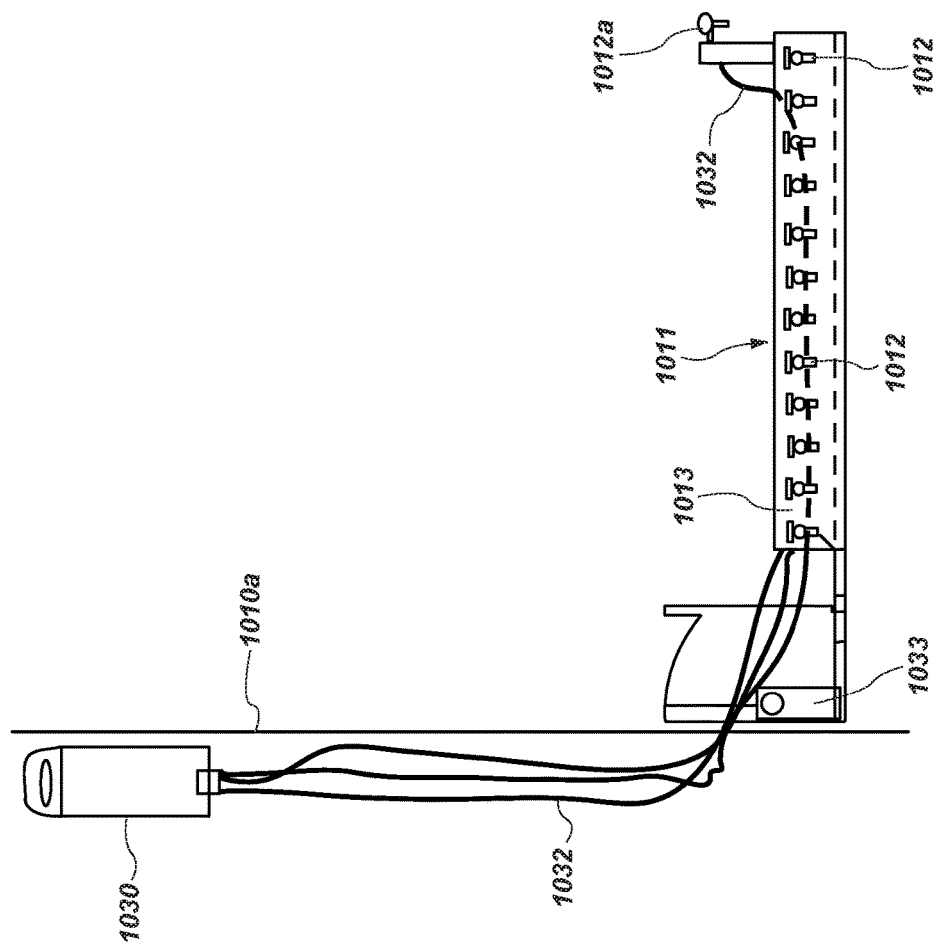
FIG. 10 illustrates an implementation of an open dispenser or dispenser in the dispensing mode in relation to an edifice in accordance with the teachings and principles of the disclosure.

Referring now to FIG. 10, in various implementations, the dispenser 1011, and also includes 111, 411, 511, 611, 711, etc. may comprise a dedicated spout 1012a that may be attached to hosing or tubing that is in fluid communication with a reservoir 1030 that may house lemonade or other beverage, such that the dedicated spout 1012a may dispense the lemonade or other beverage. It will be appreciated that the dedicated spout 1012 may be located anywhere on the dispenser 1011, but it may be advantageous from an end user standpoint to provide such a dedicated spout at an end of the dispenser for easy access by patrons. In an implementation, a plurality of dedicated spouts may be used for dispensing lemonade or other beverage. For example, in an implementation, there may be an angled or two angled lemon shaped spouts or faucets located on the end or on the top of the frame work of the dispenser.

Figure 11:
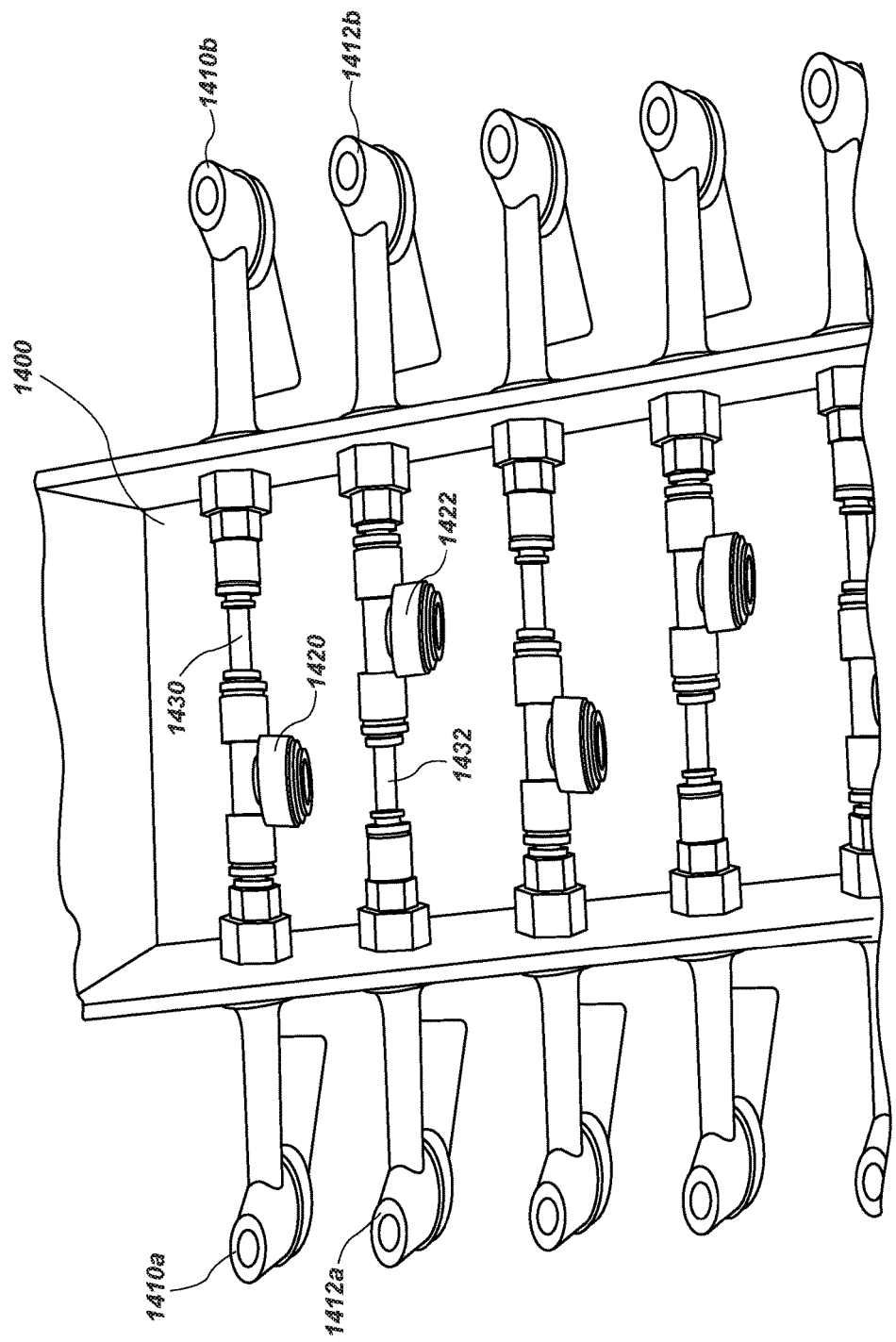
FIG. 11 illustrates an implementation of a liquid topping dispensing framework in accordance with the teachings and principles of the disclosure.
Figure 13:
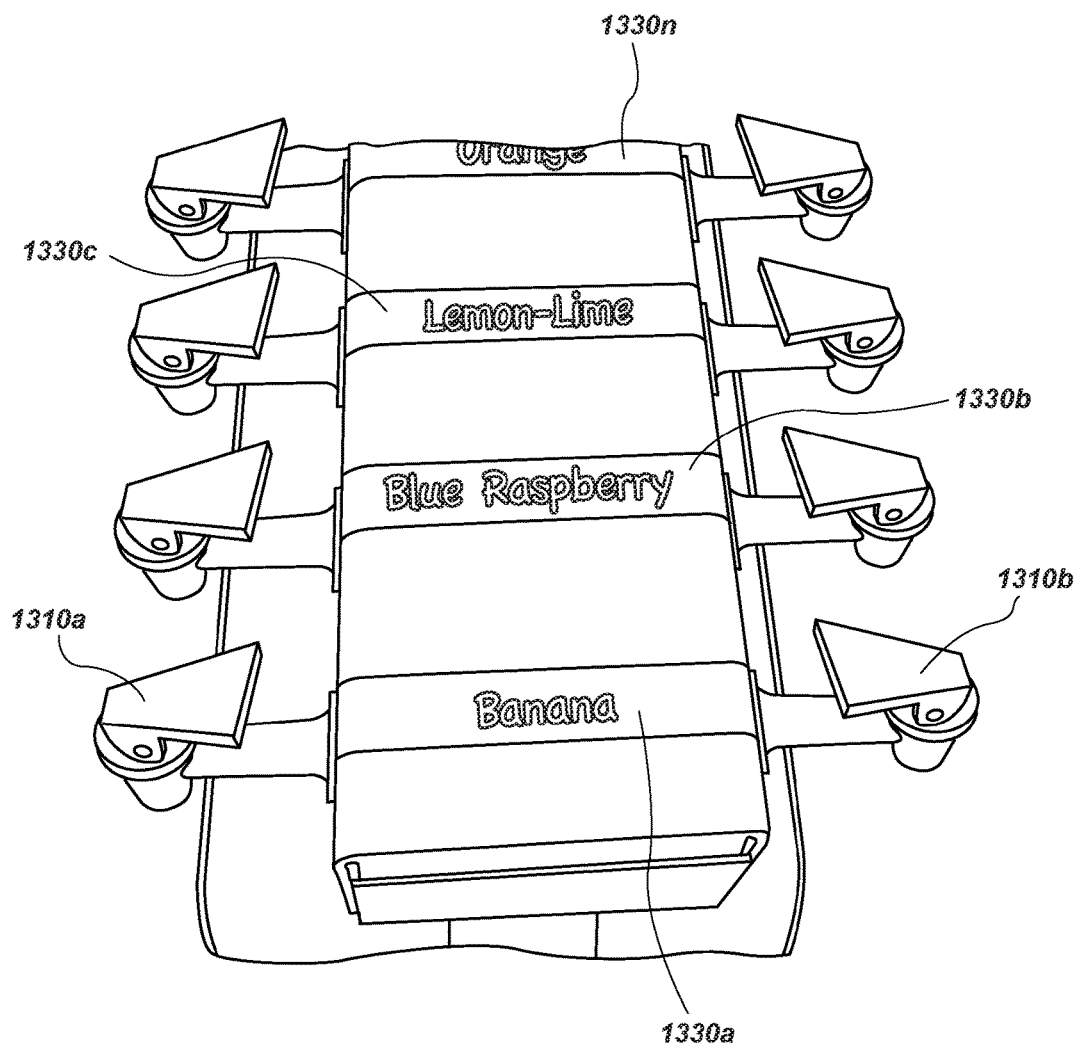
FIG. 13 illustrates an implementation of a liquid topping dispensing framework in accordance with the teachings and principles of the disclosure.

Illustrated in FIG. 11 is an embodiment of a liquid topping dispensing framework 1400. As can be seen in the figure, a plurality of liquid topping spouts, such as spouts 1410a, 1410b, 1412a, and 1412b can be attached to the framework 1400. The spouts 1410 may be disposed in pairs on opposing surfaces of the framework 1400, so as to form spout pairs, for example 1410a and 1410b, 1412a and 1412b. The spout pairs may be fluidicly connected into pairs with hose 1430 and hose 1432, respectively. It will be appreciated that each of the spout pairs may pour or dispense a single flavoring (or the same flavoring) simultaneously, such that there may be two different users on opposing sides of the framework 1400 dispensing the same flavoring and such dispensing may occur simultaneously. Such simultaneous use may be advantageous when there are large crowds to move customers through the dispensing line as quickly as possible. As illustrated in FIG. 13, the spout pairs, such as 1310a and 1310b, may comprise a label 1330a, 1330b, 1330c, 1330n to convey the flavoring of the topping to be dispensed that is associated with the spout pairing. For example, the spout pairing 1310a and 1310b have a banana label 1330a to indicate that spout pair comprises banana flavoring topping. It will be appreciated that any topping or flavor may be dispensed from the spout pair.

It will further be appreciated that the spouts do not have to be organized into spout pairs, but instead each of the spouts may simply correspond to a single flavoring or topping without departing from the scope of the disclosure. Similarly, it will be appreciated that a plurality of spouts may correspond to a single flavoring or topping without departing from the scope of the disclosure.

As can be seen in FIG. 11, hose fixtures 1420 and 1422 may be staggered when compared to preceding hose fixtures (or hose fixtures located before or after the hose fixture in question) to allow for more efficient hose line positioning. For example, a hose connected to fixture 1420 will not interfere with a hose connected to fixture 1422. Such a configuration allows for maintaining a plurality of hoses without kinking or otherwise create problems associated with many hoses in the same line.

Figure 12:
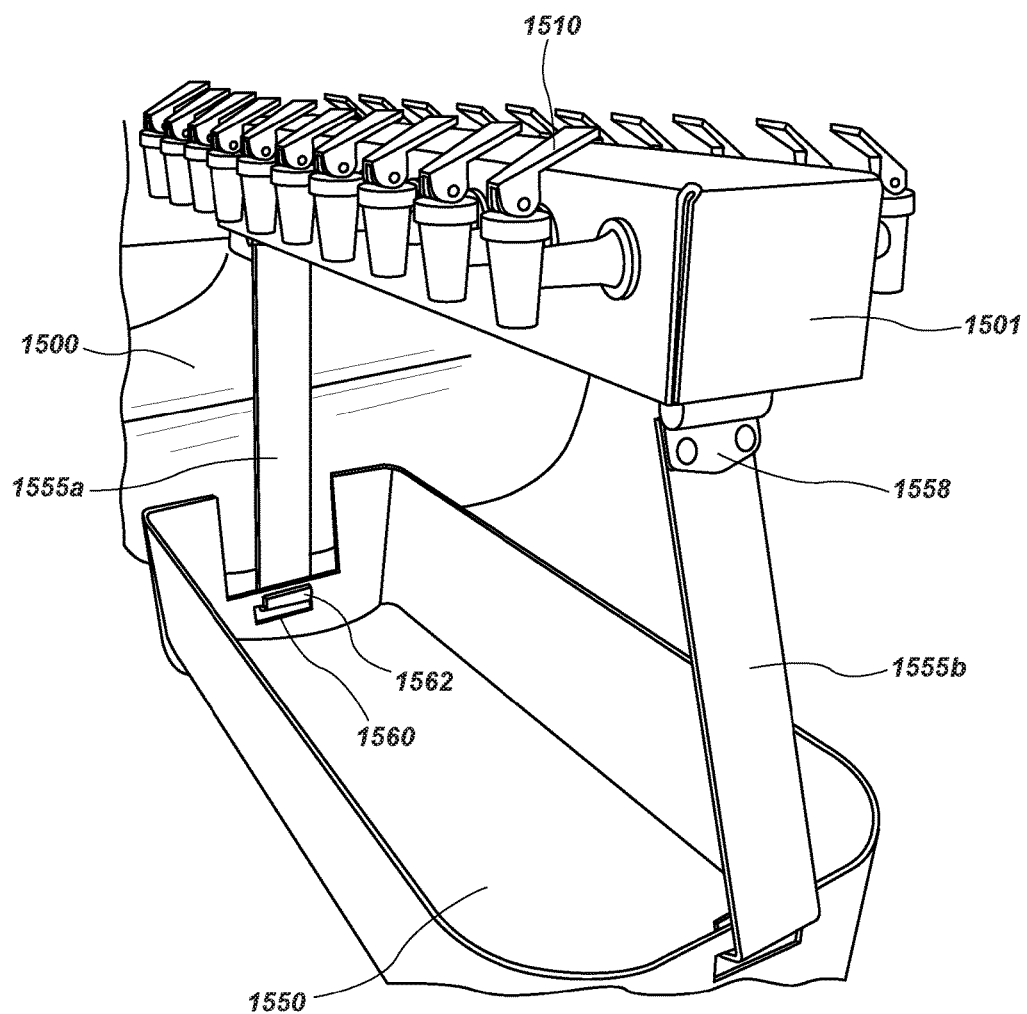
FIG. 12 illustrates an implementation of a topping dispenser located on the side of an edifice for dispensing frozen confections in accordance with the teachings and principles of the disclosure.

Illustrated in FIG. 12 is a topping dispenser 1501 located on the side of an edifice 1500 for dispensing frozen confections. As illustrated in the figure, a topping dispenser may comprise a plurality of spouts 1510 connected to a framework 1501. Additionally, an implementation may comprise a drip catch 1550 to control possible spills during use of the spouts 1510. The drip catch 1550 may be attached to the framework 1501 with an attachment mechanism. The attachment mechanism may be an arm, or plurality of arms 1555a and 1555b, which may be attached to the framework 1501 with a hinge 1558. As seen in the figure, an arm 1555a may comprise an attachment structure, such as a hook 1562 or other attachment structure, which corresponds to an attachment structure of the drip catch 1550, such as slot 1560. It will be appreciated that the drip catch 1550 may operate and function as a cover or lid when the framework is in its traveling or un-deployed position (closed position) and may operate and function as a drip pan when the framework is in its useable or deployable position (open position).

In various implementations the plurality of dispensers may be configured differently to attach to different portions and structures of the mobile edifice. In an implementation a first dispenser may be configured to attach to a side surface of an edifice, while a second dispenser may be configured to fit over a window or door of the edifice. A second dispenser may comprise a linkage or may be statically attached to the edifice.

In various implementations, a stand for holding or otherwise housing reservoirs and tubes, hoses or lines may be located outside of the edifice. The stand may be a metal stand or made from another material and may be configured to fit inside the edifice for transport to a location.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A liquid confection topping dispenser for mounting to an edifice comprising:
   a dispenser framework having a plurality of spouts mounted thereto, wherein the plurality of spouts are configured to dispense a topping;
   wherein the dispenser framework is mounted to the edifice via a linkage allowing the dispenser to be deployed from a closed position to an open position and from an open position to a closed position;
   wherein the dispenser framework is substantially aligned with a substantially vertical surface of the edifice while in the closed position;
   wherein the dispenser framework extends out from the surface of the edifice while in the open position; and
   a drip catch which detaches from the dispenser for deployment for use when the dispenser is in the open position.

2. The dispenser of claim 1, wherein the drip catch comprises a cover for entirely covering the dispenser framework and spouts while in the closed position.

3. The dispenser of claim 2, wherein the cover is detachably connected to the edifice while the dispenser is in the closed position.

4. The dispenser of claim 2, wherein the cover is detachably connected to the framework while the dispenser is in the closed position.

5. The dispenser of claim 1, further comprising a deployment mechanism for opening and closing the dispenser from within the edifice.

6. The dispenser of claim 5, wherein the deployment mechanism comprises a lever for opening and closing the dispenser from within the edifice.

7. The dispenser of claim 5, wherein the deployment mechanism comprises a cable for opening and closing the dispenser from within the edifice.

8. The dispenser of claim 1, wherein the linkage is a pivot having a single degree of freedom of movement.

9. The dispenser of claim 1, wherein the linkage is configured to have two degrees of freedom of movement, such that the open position can be adjusted during deployment.

10. The dispenser of claim 1, wherein the linkage is configured to have three degrees of freedom of movement, such that the open position can be adjusted during deployment.

11. The dispenser of claim 1, wherein the dispenser further comprises a plurality of topping reservoirs corresponding to the plurality of spouts and wherein the topping reservoirs are in fluid communication with the plurality of spouts.

12. The dispenser of claim 11, wherein the plurality of spouts are connected fluidicly to a single reservoir such that the same topping is dispensed from a plurality of spouts.

13. The dispenser of claim 1, further comprising at least a first drip catch arm that is configured to attach the drip catch to the framework.

14. The dispenser of claim 13, wherein the at least first drip catch arm comprises a hinge disposed between the drip catch arm and the framework.

15. The topping dispenser of claim 13, wherein the drip catch comprises an attachment structure that is configured to receive a hooked portion of the at least first drip catch arm.

16. The dispenser of claim 13, wherein the at least first drip catch arm comprises a plurality of drip catching arms configured to attach the drip catcher to the framework, wherein the drip catching arms removably attach to opposing ends of the drip catch.

17. A mobile system for providing frozen confections comprising:
   a mobile edifice comprising:
   a frozen confection machine disposed on the mobile edifice for providing conditioned ice;
   a topping dispenser for dispensing liquid topping to the frozen confection comprising:
   a dispenser framework having a plurality of spouts mounted thereto for dispensing a topping;

a linkage wherein the dispenser is mounted to the edifice though the linkage allowing the dispenser to be deployed from a closed position to an open position and from an open position to a closed position;

wherein the dispenser is substantially aligned with a substantially vertical surface of the edifice while in the closed position;

wherein the dispenser is substantially normal with a substantially vertical surface of the edifice while in the open position; and a drip catch deployed while the dispenser is in the open position, wherein the drip catch is separable from the system.

18. The system of claim 17, wherein the drip catch comprises a cover for entirely covering the dispenser framework and spouts while in the closed position.

19. The system of claim 18, wherein the cover is detachably connected to the edifice while the dispenser is in the closed position.

20. The system of claim 18, wherein the cover is detachably connected to the framework while the dispenser is in the closed position.

21. The system of claim 17, further comprising a deployment mechanism for opening and closing the dispenser from within the edifice.

22. The system of claim 21, wherein the deployment mechanism comprises a lever for deploying the dispenser wherein the lever provides leverage to a user to assist in actuating the linkage.

23. The system of claim 21, wherein the deployment mechanism comprises a cable for deploying the dispenser wherein the cable attaches to the dispenser at a first end and the mobile edifice at a second end.

24. The system of claim 17, wherein the linkage is a pivot having a single degree of freedom of movement.

25. The system of claim 17, wherein the linkage is configured to have two degrees of freedom of movement such that the open position can be adjusted during deployment.

26. The system of claim 17, wherein the linkage is configured to have three degrees of freedom of movement such that the open position can be adjusted during deployment.

27. The system of claim 17, wherein the mobile edifice is a vehicle.

28. The system of claim 17, wherein the mobile edifice is a shack that can be relocated as desired.

29. The system of claim 17, wherein the mobile edifice is a kiosk that can be relocated as desired.

30. The system of claim 17, wherein the mobile edifice comprises a plurality of dispensers.

31. The system of claim 30, wherein at least two of the plurality of dispensers are configured differently to attach to different portions of the mobile edifice.

* * * * *